July 14, 1925.

J. M. HENTON

BEET HARVESTER

Filed Dec. 10, 1920

Inventor
J. M. Henton
By E. A. Holladay
Attorney

July 14, 1925.
J. M. HENTON
BEET HARVESTER
Filed Dec. 10, 1920
1,545,900
5 Sheets—Sheet 2
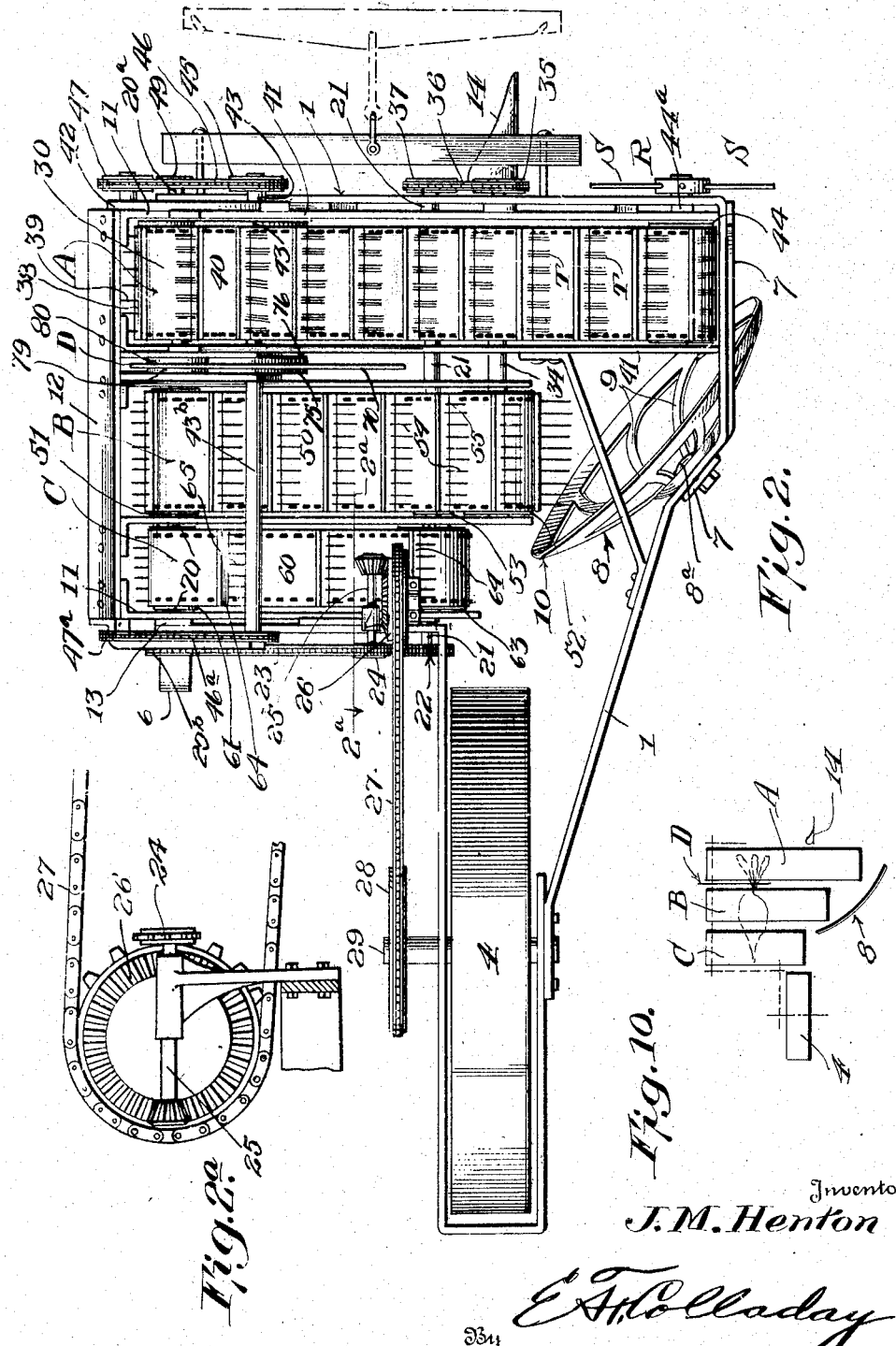
Inventor
J. M. Henton
By E. F. Holladay
Attorney

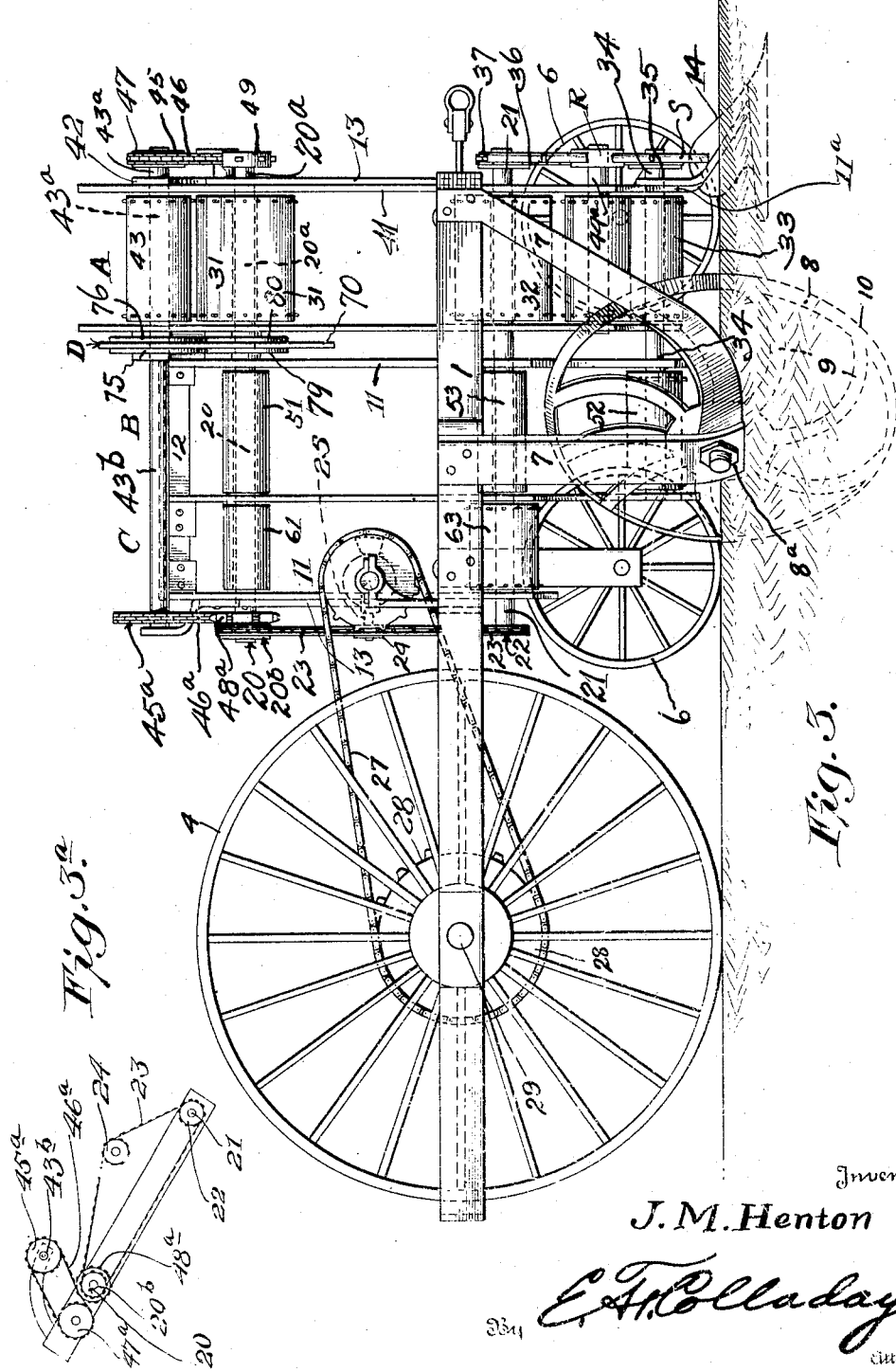

July 14, 1925. 1,545,900
J. M. HENTON
BEET HARVESTER
Filed Dec. 10, 1920 5 Sheets-Sheet 4
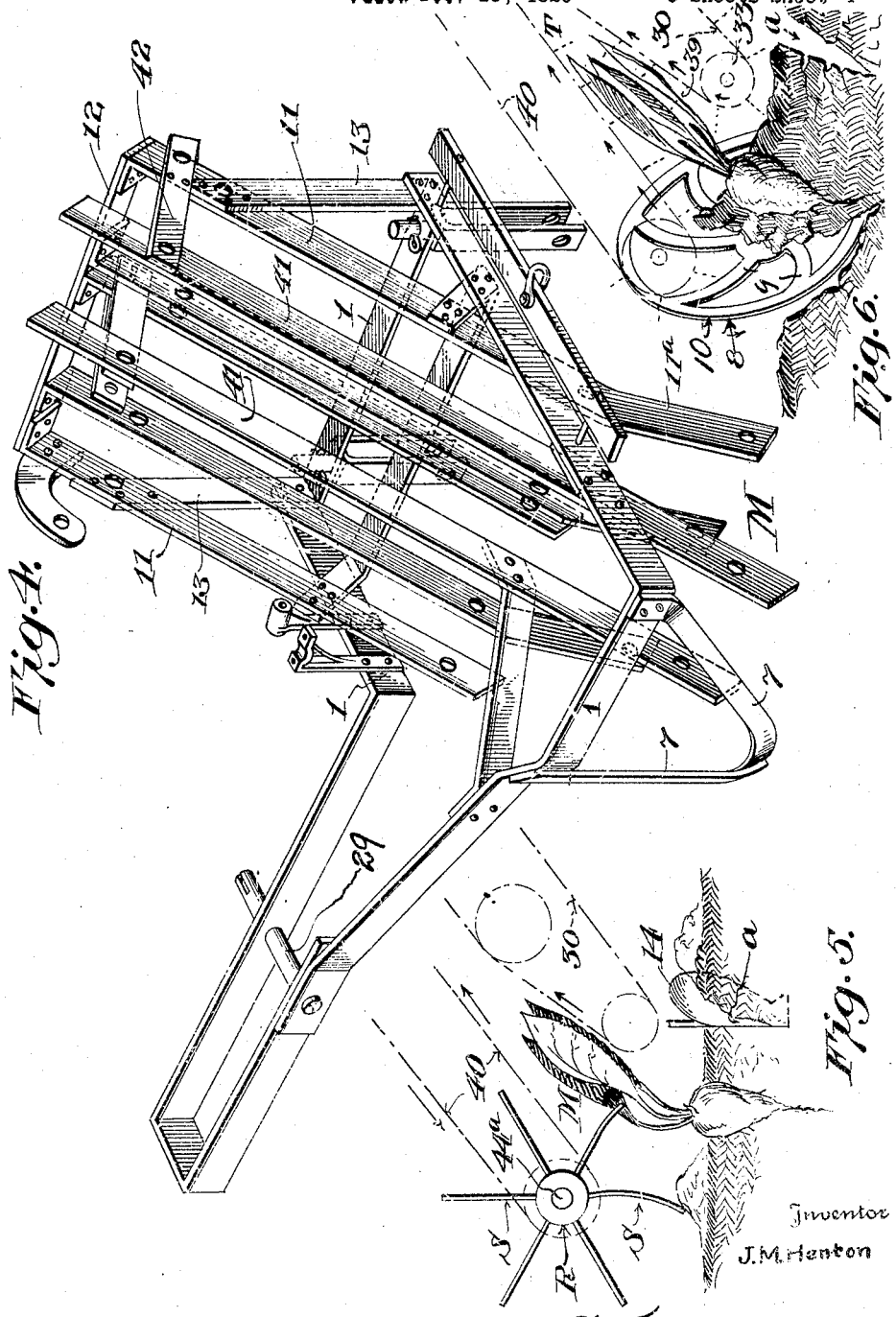

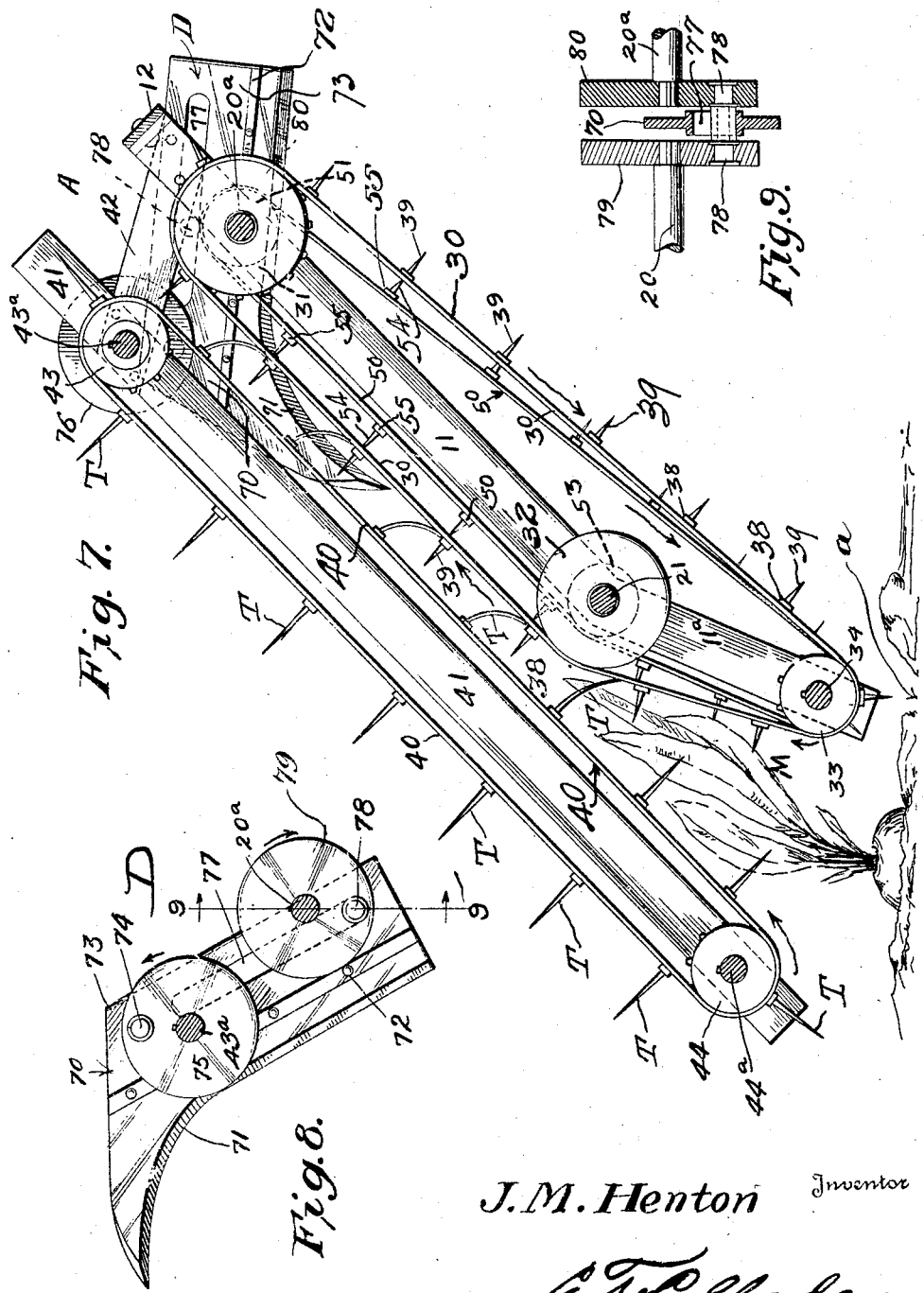

Patented July 14, 1925.

1,545,900

UNITED STATES PATENT OFFICE.

JOHN M. HENTON, OF HOT SPRINGS, SOUTH DAKOTA.

BEET HARVESTER.

Application filed December 10, 1920. Serial No. 429,748.

*To all whom it may concern:*

Be it known that I, JOHN M. HENTON, citizen of the United States, residing at Hot Springs, in the county of Fall River and State of South Dakota, have invented certain new and useful Improvements in Beet Harvesters, of which the following is a specification.

This invention relates to agricultural machinery, and more particularly to an improvement in beet harvesters.

One of the objects of the invention is to provide a simple and practical machine for removing the beet roots from the ground and conveniently and expeditiously removing the tops in a thoroughly effective and reliable manner, thereby obviating the necessity of a separate topping operation by hand after the beets have been removed from the ground. And, in carrying forward this object, it is proposed to provide a novel arrangement of beet handling instrumentalities including a novel digging and lifting unit arranged to cooperate with means for elevating or conveying the beets into the zone of a cutter device for performing the topping operation.

Another object of the invention is to provide novel means for firmly holding the beet tops during the elevating and action of the cutter in separating them from the body of the beet. That is to say, it is proposed to provide practical and effective means for clamping or gripping the tops or foliage of the beets in a positive and effective manner.

A further object of the invention is to provide a machine that is of strong and simple design, and the parts of which are readily accessible, and the flexibility, simplicity and uniformity of which make the device almost wholly self adjusting to the varying conditions encountered in actual use.

With the above and other objects in view which will more readily appear as the nature of the invention is better understood the same consists in the novel construction, combination and arrangement of parts hereinafter more fully described, illustrated and claimed.

A preferred and practical embodiment of the invention is shown in the accompanying drawings, in which:—

Figure 2 is a top plan view thereof.

Figure 1:
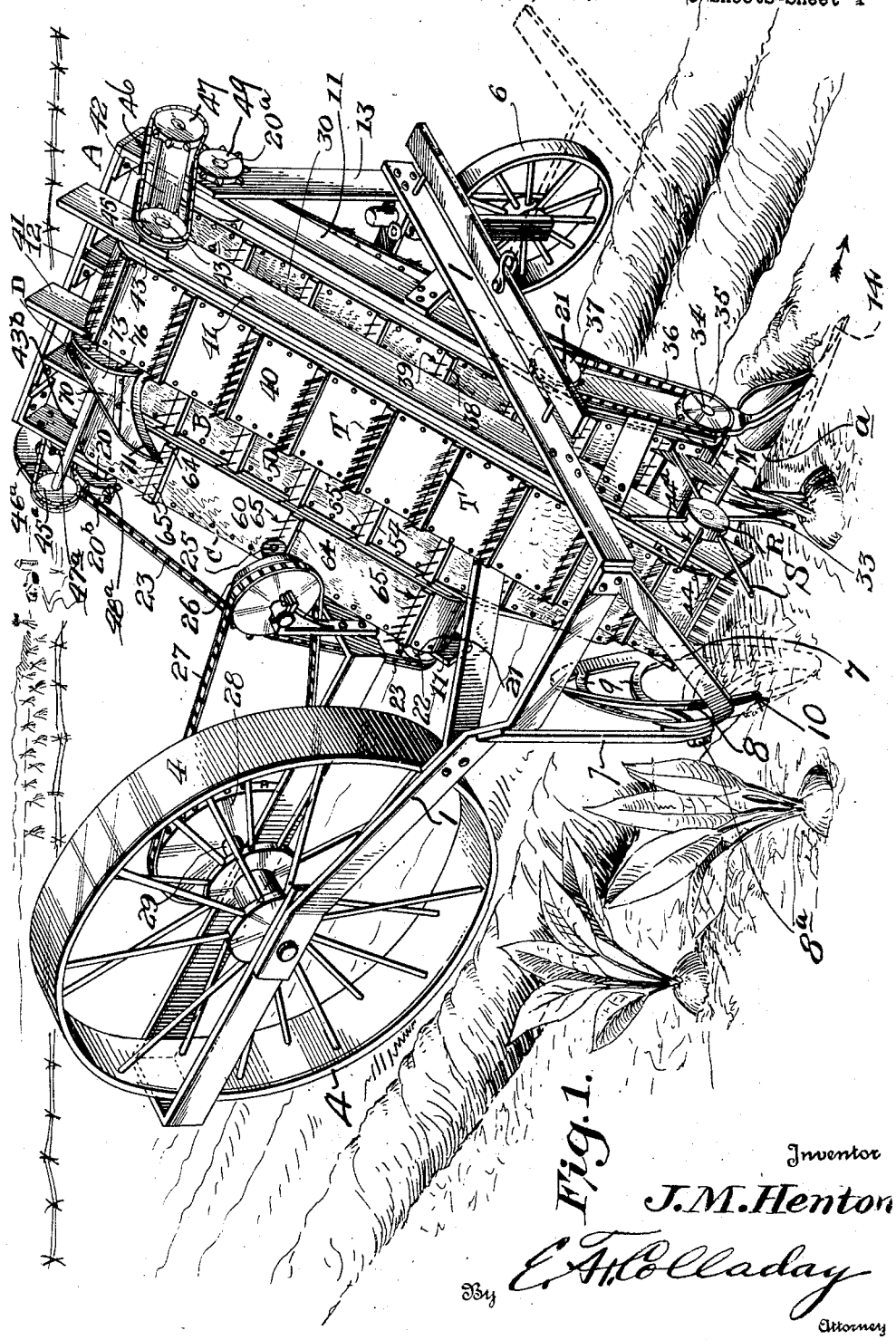
Figure 1 is a perspective view of the complete beet harvesting machine.

Figure 2$^a$ is a detail cross sectional view on the line 2$^a$—2$^a$ of Figure 2.

Figure 3 is a side elevation of the machine, looking at the digging and lifting unit.

Figure 3$^a$ is a detail elevation of the arrangement of the drive chains and sprockets.

Figure 4 is a perspective view of the skeleton frame of the machine.

Figure 5 is a diagram illustrating the relative position of the plow and rotary rake which beats or sweeps the tops of the beets into the path of top engaging instrumentalities.

Figure 6 is a diagram illustrating the action of the digging and lifting unit in conjunction with the elevating instrumentalities indicated by dotted lines in Figure 5.

Figure 7 is a vertical cross sectional view through the top engaging and elevating unit.

Figure 8 is a detail view of the top shearing knife.

Figure 9 is a detail sectional view taken on the line 9—9 of Figure 8.

Figure 10 is a diagram of the entire machine, illustrating the general relation of the several units and the manner of handling the individual beets.

Similar reference numerals designate corresponding parts throughout the several figures of the drawings.

In carrying the present invention into effect, it is proposed to provide a machine of the type that may be drawn over the rows of beets by any suitable traction device to lift beets, without bruising or cutting, into suitable elevating or conveyor units which effectively provide for advancing the beet roots and the tops into the zone of a cutting device for severing the foliage or tops, and then carrying both the beet and tops separately to the point of collection.

Accordingly, as will be observed from the drawings the machine includes in its organization a traveling frame 1 mounted upon suitable trucks or wheels such, for instance, as those indicated at 6—6 and 4, one of which, for instance, the latter, may constitute a drive wheel for the elevating instrumentalities.

At the side of the frame opposite said wheels 6 there is provided a depending strap or hanger bracket 7 carrying at the lower end thereof a novel digging and lifting unit of any desired type that will effectually lift the beet from the ground. One type of unit of this character is shown in the drawings and consists of a concavo convex wheel 8 of skeleton or open formation having the spirally disposed spokes 9 and the earth cutting rim or edge 10.

In connection with this wheel, it will be observed that the same is of relatively large diameter and may be disposed at an oblique angle to the longitudinal axis of the machine, and, as will be observed from Figure 3, the axis 8ª of the wheel is in substantially the same plane as the rim or tread portion of the drive wheel 4 and swiveled side wheels 6—6, so that practically the entire lower half of the said wheel works in the earth, reaching beneath and under the beet positions to lift the beet and surrounding earth from the ground in a manner that will hereinafter more fully appear.

In addition to supporting the traction elements previously referred to, the said rectangular frame portion 1 carries a secondary frame for the elevating units. This secondary frame includes the parallel frame bars 11 and the cross bar 12 at one end thereof, and the whole is supported in an inclined position by the braces 13 (Fig. 4). The lower end 11ª of one of the frame bars 11 carries therewith the plow or like member 14, which, it will be observed from Figures 1, 2 and 3 is arranged in advance of the entire frame to make a cut or furrow in the earth, at one side of the row of beets to provide a valley or clearance $a$ to provide a channel for the lifting conveyor whereby it may more effectually reach beneath the beet to engage therewith, while at the same time providing an easement for the earth displaced by the wheel 8 to thereby enable the same to readily progress and more freely remove the beet from the ground, (see Figs. 5 and 6). That is to say, the plow 14 being in advance of the wheel 8 provides an easement clearance or furrow which enables the obliquely disposed wheel 8 to easily push the earth surrounding the beet to one side and more freely reach beneath the beet to carry out the lifting function which takes place as the wheel is rotated by its engagement with the earth during the movement of the machine.

With the arrangement described, it will be apparent that the means shown in the present embodiment for working the earth around the beets as the machine travels along on its supporting wheels, are the plow 14 working in advance of the frame of the machine and the obliquely disposed digging and lifting wheel whose leading edge works from a point considerably to the outside of the row of beets back to substantially the line of cut made by the plow 14. As the wheel 8 is of open or skeleton formation, it will be apparent that much of the earth surrounding the beets will be sifted or separated from the beet before the latter is delivered to the elevating means.

The elevating instrumentalities intended to receive and carry the beet after it is removed from the ground, preferably comprise a series of elevating conveyor units for handling the beet in such a manner that the tops however luxuriant are clamped and held in proper position to permit of their being severed from the beet. As will be seen from Figures 1, 4, 5, 6 and 7 several elevating units are inclined upwardly and away from the zone of the digging operation; and, in this connection, it will be observed that the digging unit 8 is preferably disposed directly in front of and in delivering relation to the intermediate elevating unit to properly position the beet root thereon while the top clamping unit immediately in advance thereof, takes care of the top.

Referring now more in detail to the elevating devices, it will be observed that the same preferably include the juxtaposed units A, B and C, the unit A being particularly intended to handle the tops or foliage of the beets while the unit B carries the body of the beet and the unit C propels the tail or root end thereof at a somewhat faster speed than the body carried by the unit B which has the effect of shaking the beet to remove the earth clinging thereto and also holding the small end of the beet to steady the same as it is subjected to the action of the cutting device D arranged between the units A and B.

For the purpose of supporting the conveyors in their proper relation, suitable shafts may be employed, such for instance as shown more clearly in Figure 3, wherein the upper shaft consisting of the sections 20 and 20ª supports the upper ends of the conveyors. These shaft sections are journaled in the parts 11 of the secondary frame, and while driven to actuate the cutting device D and the upper conveyor of the top handling unit as will presently appear, act as a support for idler pulleys over which the upper ends of the conveyors run. The lower end of the conveyor of the unit C is supported on a pulley on the shaft 21 which is in effect the main drive shaft for the several units the same receiving its power through a sprocket 22 at one end engaging with the chain 23 driven by the sprocket 24 carried by stub shaft 25 actuated by bevel gear 26, which in turn receives its motion through the medium of the chain 27 from the main driving sprocket 28 on the shaft 29 of the traction wheel 4 (see Figs. 2 and 2ª). The chain 23 in addition to passing over the sprockets 22 and 24 referred to, also engages with the sprocket 20ᵇ on the shaft 20, which shaft, it will be remembered consists of parts 20 and 20ª which are connected by a part of the cutting device as will hereinafter more fully appear.

Referring now more particularly to the elevating unit A which handles the top or foliage of the beets exclusively, it will be observed that the same includes in its organization a pair of conveyors arranged in superposed relation. (See Figure 7.) The lower conveyor 30 is supported upon the idlers 31 and 32 respectively carried by the shaft section 20ª and drive shaft 21, and also upon the driving pulley 33 mounted upon a counter-shaft 34 at the lower end of the angular portion 11ª of the secondary frame. This counter-shaft 34 receives its power through a sprocket 35 and chain 36 passing over the sprocket 37 on the main drive shaft 21.

The said conveyor 30 may be in the form of the flexible web shown in the drawings having sprocket wheel engaging means at its outer edges, or chains may be used having transverse connecting slats or strips in the well known manner. In any event, however, the outer face of the conveyor is provided at spaced intervals with transverse bars 38 carrying pins or spikes 39 flexible, however, to be self adjusting to varying conditions of foliage and terrain, as well as alinement and arranged in transverse rows at regular spaced intervals throughout the length of the conveyor. These pins or spikes serve to impale and hold the foliage or tops, and in order to render the engagement of the foliage with the pins or spikes more positive and effective to thereby hold the same tightly during the cutting operation, an upper conveyor 40 is provided, the same carrying flexible clamping means T longer than the spikes 39 for cooperating with the latter as will presently appear.

The said upper conveyor 40 is carried in a separate frame consisting of the side bars 41 and supports 42, and passes over pulleys or drums 43 and 44, located at opposite ends of the side bars 41, the former pulley being driven independently of the means for actuating the lower conveyors 30, while the pulley 44 is an idler on a shaft 44ª. The purpose of driving the pulley 43 independently, as above set forth is to permit of the conveyor 40 being propelled faster than the lower conveyor 30, and to this end the shaft 43ª of the pulley carries a sprocket 45 which engages with the chain 46 passing over sprocket 47, which chain 46 is propelled by engagement with sprocket 49 on the shaft section 20ª. The conveyor 40 is therefore driven through shafting 20 and 20ª and the sprocket chains and connections 45—49, inclusive. In connection with the sprocket 45 it is to be noted that the same is smaller than the driving sprocket 49 to obtain the accelerated speed of conveyor 40 as previously explained.

One of the novel and distinctive features of the upper conveyor 40 is the provision thereon of a plurality of transverse rows of relatively long flexible teeth or rake elements T which yield or bend when they come into engagement with the upper reach of the conveyor 30 carrying the transverse rows of spikes or spines 39 of the lower conveyor 30. As shown in Figure 7, when the teeth T are flexed or bent in passing through the relatively narrow throat between the two conveyors, they will have the effect of clamping or holding the foliage of the beets on the spikes or pins as they are progressively advanced toward the knife of the cutting device D, and because of the fact that the upper conveyor 40 travels faster the teeth T will yieldingly comb the leaves into firm engagement with the spikes 39.

In the unit A, it will be observed that by reason of the angular form of the lower ends of the bars 11, heretofore described, a relatively wide entrance mouth M is provided at the lower end of the conveyors 30 and 40 to provide adequate clearance for receiving the beet tops which in some instances are very luxuriant. And, in order to facilitate the engagement of the tops of the beets, the end of shaft 44ª carries a rotary beater R whose flexible arms or spokes S sweep or knock the tops of the beets into the mouth M of the conveyor unit as clearly shown in Figures 1, 5 and 6. By reason of the flexible nature of the spokes S the same will readily yield or give when striking uneven terrain.

Summarizing the features of the unit A which handles the tops or foliage of the beets, it will be apparent that the same comprises the upper and lower conveyors 40 and 30 arranged to form a relatively wide receiving mouth between their lower ends, and a constricted throat through which the tops pass while being clamped or held by the flexible teeth of the upper conveyor in conjunction with the flexible pins or spikes of the lower conveyor as they pass the knife of the cutting device. And, in connection with the initial functioning of this unit, it will be apparent that the rotary beater R assists the gathering of the tops into the mouth of the unit by deflecting the leaves and stalks to one side and beneath the lower reach of the upper conveyor 40 which passes over the beet position in the hill substantially simultaneously with the action of the digging and elevating wheel 8 and which removes the beet from the ground and elevates or turns the same into position to be delivered to the beet carrying unit B.

The intermediate unit B that provides for elevating the body of the beet includes a suitable conveyor 50 supported at its upper end on an idler pulley 51 on the shaft section 20 while its lower end passes over a driving pulley 52, or its equivalent, carried by the counter-shaft 34. The intermediate portion of the conveyor 50 also preferably passes over an idler 53 on the shaft 21, which idler 53 is of relatively small diameter to make the upper reach of the conveyor 50 lie in the lower plane than the conveyor 30 of the unit A to compensate for the difference in diameter between the bodies of the beets and the center of the crowns. The lower end of this beet elevating conveyor 50 is arranged in relatively close proximity to the ground to assist in lifting and elevating the beet, and is carried upon a pulley or sprocket 52 which may be of the same diameter as the pulley 33, but in practice it may be desirable to make the sprocket 52 of slightly larger diameter so that the conveyor 50 may operate somewhat faster than the conveyor 30 to prevent lagging of the relatively heavy body of the beet. Therefore, both conveyors 30 and 50 may be given their movement through the shaft 34 driven from the main shaft 21 through the sprocket and chain arrangement 35, 36 and 37.

At spaced intervals transversely of the conveyor 50 are a plurality of transversely disposed rows of flexible pins or spikes 54 carried upon the bars or slats 55, and said pins or spikes serve to lift and hold the beet on the conveyor, and provide in effect divisions or sections on the surface of the conveyor in which the individual beets rest as they proceed upwardly to the position of the cutting device D which is located above, and operates between, the units A and B.

At one side of the beet elevating conveyor 50 and rearwardly thereof is located the conveyor unit C which engages the tail or root end of the beet and travels at a faster speed than the conveyor 50 to have the effect of crowding the body of the beet toward the edge of the conveyor 50 nearest the cutting device, and at the same time serving to hold the beet roots in position on the conveyor 50 as they pass beneath the cutting knife. By reference to the drawings, it will be seen that the conveyor 60 of the unit C passes at its upper end over an idler pulley 61 on the shaft section 20 while the lower end engages over a drive pulley 63 on the main drive shaft 21. The said drive pulley 63 is sufficiently large in diameter as compared with the driving pulley for the conveyor 50 to permit of the conveyor 60 traveling at a faster speed than the conveyor 50, and, as shown, the upper side of the said conveyor 60 carries the transverse bars 64 and carrying therewith flexible upstanding pins or spikes 65 for engaging with the tail or root end of the beet. By reason of the conveyor 60 traveling at a greater speed than the conveyor 50, it will be apparent that as the latter advances the beet upwardly toward the cutting devices D, the pins 65 of the conveyor 60 will exert a holding pressure on the root end of the beet which will be sufficient to set the same in position for the cutting operation. This conveyor unit C is particularly useful in the handling of beets of different sizes, since by reason of its relatively accelerated movement with reference to the conveyor 50, it will enable relatively small beets to be held against the rows of pins 54 where they might otherwise drop or slip back out of alinement for the cutting operation.

Referring more in detail to the cutting device D, it will, of course, be understood that any suitable and convenient type of cutter may be employed, but the type shown in the drawing may advantageously be used.

The cutting device shown may consist of a cutter 70 having a relatively long curved cutting blade 71 detachably fitted as at 72 to the cutter stock 73 pivotally supported on a crank pin 74 carried by a pair of duplicate crank disks 75 and 76, the former being mounted upon the shaft 43$^a$ which carries the means 43 for driving the belt 40, while the latter is carried upon a stub shaft 43$^b$ extending over and across the units B and C and carrying at its outer end a sprocket wheel 45$^a$ adapted to be driven in the same manner as the sprocket wheel 45 on the end of the shaft 43$^a$. That is to say, the sprocket and chain arrangement 45—49 inclusive, is duplicated at the rear side of the frame 11 for driving the sprocket 45$^a$. Therefore, as will be observed from Figure 3$^a$, the supplemental means for driving the shaft 43$^b$ consist of sprocket 45$^a$, chain 46$^a$, idler sprocket 47$^a$ and sprocket 48$^a$ on the end of shaft section 20, and at one side of the sprocket 20$^b$ which is driven by chain 23.

The lower end of the knife stock 73 is supported in a manner similar to the upper end thereof and in order to permit the proper rocking movement of the knife to carry out the cutting or slicing off of the tops, the said cutter stock 73 is provided with a slot or runway 77 for receiving the crank pin 78 eccentrically carried by crank disks 79 and 80 respectively carried upon the inner ends of the shaft sections 20 and 20$^a$.

From the foregoing description of the cutter device, it will be apparent that the same is in the form of a knife which performs its cutting stroke in the manner of chopping or slicing and that while the primary source of actuation therefor is the shaft section 20, the instrumentalities associated with the shaft section 20ª, and the shafts 43ª and 43ᵇ serve to steady the knife in its action and generally stabilize the performance of this important unit of the machine.

As the machine embodying the foregoing novel structural units is drawn through the beet field by any suitable traction means, the plow 14 will first make a furrow or valley at one side of the beet row while the transversely arranged rotary beater R will beat or sweep the tops of the beets into the mouth M of the top handling unit A which gathers in the foliage by reason of the superposed moving conveyors 30 and 40 while at the same time the digging and lifting unit 8, lifts the beet from the ground, and as the movement of the machine progresses, lifts or lays the beet onto the conveyor 50 of the unit B. As soon as the beet is deposited on the conveyor of the unit B, the root end or tail thereof will be picked up by the relatively fast moving conveyor of the unit C and the conveyors 30, 40 and 50 moving upwardly will securely hold the beet in position to be acted upon by the knife of the cutting device D. After the top is separated from the body of the beet the tops are discharged over the upper end of the conveyor 40 into suitable bags or other receptacles which may be carried by the frame bar 12 if desired, or into other means for collecting and carrying the beets and tops from the field.

I claim:—

1. A beet harvesting machine including a traveling frame, elevating means carried thereby and comprising a series of separate conveyor units arranged side by side for handling the meat and foliage of the beets, means whereby certain of said conveyors may be operated at a faster speed than an adjacent one, a cutting device arranged to operate between certain of said conveyors, and a digging and lifting unit for removing and lifting the beet from the ground and delivering the same to one of said conveyors.

2. A beet harvesting machine including a traveling frame, beet digging and lifting means carried thereby, a cutting device, and elevating means for receiving the beet from the digging and lifting means and conveying the same to the cutting device, said means including separate conveyors for carrying the tops and the meat portions of the beets, and means for operating said conveyors.

3. A beet harvesting machine including a traveling frame, beet digging and lifting means carried thereby, elevating means carried in receiving relation to the digging and lifting means and including separate elevating conveyors respectively for the top and meat portions of the beet, means for operating the said conveyors, and a superposed holding conveyor arranged above the conveyor for handling the tops of the beets, and means whereby the said superposed conveyor travels at a faster speed than the elevating conveyors.

4. A beet harvesting machine including a traveling frame, beet elevating means carried thereby, and comprising a series of conveyor units including lower elevating conveyors and a superposed holding conveyor for one of said elevating conveyors, one of said lower conveyors traveling at a different speed from an adjacent one, and means whereby the superposed holding conveyor travels at a faster speed than its companion conveyor.

5. A beet harvesting machine including a traveling frame, elevating means carried thereby and comprising separate beet elevating conveyor belts and a separate superposed member for one of said belts, a knife operating between certain of said belts, and steel wire projections carried by the elevating conveyor belts and the superposed members thereby to sweep up, hold, and convey the beet to the cutting device.

6. A beet harvesting machine including a traveling frame, a digging and lifting unit carried thereby, elevating means arranged in receiving relation with reference to the digging and lifting unit and comprising a series of separate elevating conveyors respectively for the tops, body and root ends of the beet, and a top cutting device arranged between the conveyors carrying the body of the beet and the tops.

7. A beet harvesting machine including a traveling frame, beet digging and lifting means carried by the frame, elevating means arranged in receiving relation to the digging and lifting means and comprising a series of separate elevating conveyor units respectively for the top, body, and root end of the beet, a top cutting device arranged between the conveyors for elevating the tops and body of the beet, means for driving the top and body carrying conveyors, and means for driving the conveyor which engages the root end of the beet at a faster speed.

8. A beet harvesting machine including a traveling frame, beet digging and lifting means carried by the frame, elevating means arranged in receiving relation to the digging and lifting means and comprising a series of separate elevating conveyor units, one of said units being adapted to handle the tops of the beets while adjacent units handle the body and root ends thereof, said top handling unit comprising a main conveyor provided with top impaling spikes, and a superposed conveyor adapted to be driven at a faster speed and carrying flexible teeth for cooperating with the spikes to clamp the tops as they advance toward the position of the cutting device.

9. A beet harvesting machine including a traveling frame, beet digging and lifting means carried thereby, a plurality of elevating conveyor units carried transversely of the frame, means for driving the conveyors of a pair of said units, a cutting device arranged between said conveyors of the said pair of units, and other means for driving the conveyor of another of said units.

10. A beet harvesting machine including a traveling frame, beet digging and lifting means carried thereby, a cutting device, and means for elevating the beets from the digging unit to the cutting device including separate conveyors arranged on opposite sides of the cutting device, and means carried by one of said conveyors for engaging the tops of the beets, a second superposed conveyor also having means cooperating with the means for engaging the tops of the beets, and means for driving said superposed conveyor at a faster speed and independently of the other conveyors.

11. A beet harvesting machine including a traveling frame, beet digging and lifting means carried thereby, a cutting device, and means for elevating the beets from the digging and lifting unit and the cutting device, including a top engaging unit consisting of a pair of superposed conveyors arranged to provide a relatively wide receiving mouth at their lower ends to receive the beet tops, top engaging spikes carried by the lower conveyor, flexible top engaging teeth carried by the upper conveyor, means for driving the upper conveyor at a faster speed than the lower conveyor, and means arranged at the mouth of said unit for whipping the foliage of the beet tops into the mouth thereof.

12. A beet harvesting machine including a traveling frame, a digging and lifting unit carried thereby, a cutting device operating at right angles to the line of progress of the machine, and means for conveying the beets from the digging and lifting unit to the knife including a series of conveyor units, one of which includes a pair of conveyors arranged in superposed relation and having cooperating beet top engaging projections, and means for whipping the tops of the beets as they stand in the row into the zone of action of the top engaging means of said superposed conveyors.

13. A beet harvesting machine including in combination, a plow for making a furrow at one side of the beet row, a plurality of elevating units arranged side by side and adapted to pass over the beet position, means operating in advance of the initial elevating unit to whip the beet top thereunto, and means arranged opposite the elevating unit for digging the beet from the ground and lifting the same onto one of said elevating units.

14. A beet harvesting machine including in combination, a plow for making a furrow at one side of the beet row, a plurality of elevating units arranged side by side and adapted to pass over the beet position, means operating in advance of the initial elevating unit to whip the beet top thereunto, and a concavo convex wheel of open formation located opposite the elevating units and arranged oblique to the path of travel of the machine whereby the rear edge thereof is arranged in delivering relation with reference to the conveyor units.

15. A beet harvesting machine including a traveling frame, beet digging and lifting means, a cutting device, and elevating means for conveying the beet and the top in a position longitudinally of the machine and parallel to the line of advance thereof from the digging and lifting means to the cutting device.

16. A beet harvesting machine including, in combination, a traveling frame, beet digging and lifting means, a cutting device for the tops, and flexible self-adjusting elevating means cooperating with the digging and lifting means for conveying the entire beet with its tops to the cutting device.

17. A beet harvesting machine including a traveling frame, beet digging and lifting means for removing the entire beet from the ground, a cutting device operating at right angles to the line of advance to the machine, and elevating means for carrying the entire beet from the digging and lifting means to the cutting device in such a position that the entire beet is disposed longitudinally of the machine and travels laterally thereof toward the knife, said elevating means comprising a series of separate conveyor belts arranged side by side for supporting and carrying the tops and meat portions of the beet, and one of said separate belts having a superposed conveyor belt traveling at a faster speed to assist in holding the beet and its tops in its advance to the cutting knife.

In testimony whereof I hereunto affix my signature in the presence of two witnesses.

JOHN M. HENTON.

Witnesses:
EMORY L. GROFF,
HELENE B. TRIEBLER.